US008932171B2

(12) United States Patent
Jun

(10) Patent No.: US 8,932,171 B2
(45) Date of Patent: Jan. 13, 2015

(54) APPARATUS FOR EQUALIZING THE TENSIONS AMONG ELEVATOR WIRE ROPES

(76) Inventor: Beong Soo Jun, Seoul (KR)

( * ) Notice: Subject to any disclaimer, the term of this patent is extended or adjusted under 35 U.S.C. 154(b) by 470 days.

(21) Appl. No.: 13/320,262

(22) PCT Filed: May 10, 2010

(86) PCT No.: PCT/KR2010/002943
§ 371 (c)(1),
(2), (4) Date: Nov. 12, 2011

(87) PCT Pub. No.: WO2010/131876
PCT Pub. Date: Nov. 18, 2010

(65) Prior Publication Data

US 2012/0055743 A1 Mar. 8, 2012

(30) Foreign Application Priority Data

May 12, 2009 (KR) ........................ 10-2009-0041074
May 6, 2010 (KR) ........................ 10-2010-0042371

(51) Int. Cl.
*F16H 37/00* (2006.01)
*B66B 7/10* (2006.01)

(52) U.S. Cl.
CPC ........................................ *B66B 7/10* (2013.01)
USPC ............................ 475/210; 187/412; 475/243

(58) Field of Classification Search
USPC ................. 475/174, 210, 248, 332, 343, 337; 187/412
See application file for complete search history.

(56) References Cited

U.S. PATENT DOCUMENTS

| | | | | |
|---|---|---|---|---|
| 6,009,979 | A * | 1/2000 | Kim | 187/239 |
| 6,488,124 | B1 * | 12/2002 | Yasuda et al. | 187/254 |
| 2004/0154876 | A1 * | 8/2004 | Choi | 187/412 |
| 2005/0098387 | A1 * | 5/2005 | Penn et al. | 187/262 |
| 2013/0112508 | A1 * | 5/2013 | Jun | 187/412 |

FOREIGN PATENT DOCUMENTS

| | | | |
|---|---|---|---|
| JP | 2005306593 | A | 11/2005 |
| KR | 200311282 | Y1 | 4/2003 |
| KR | 1020080012082 | A | 2/2008 |

* cited by examiner

*Primary Examiner* — Justin Holmes
*Assistant Examiner* — Stacey Fluhart
(74) *Attorney, Agent, or Firm* — Novick, Kim & Lee, PLLC; Jae Youn Kim

(57) ABSTRACT

Disclosed is an apparatus for equalizing tensions among elevator wire ropes, which immediately eliminates imbalance and equalizes the tensions among elevator wire ropes in the event of differences in the lengths of elevator wire ropes, thereby improving safety, durability and reliability. The apparatus automatically corrects imbalance caused by changes in the lengths of a plurality of elevator wire ropes (700) to maintain a balance in the tensions of elevator wire ropes. The apparatus includes a body (**200*f*) formed therein with a receiving space; a tension adjustment unit coupled to a plurality of belts (10*f*, 20*f*, 30*f* and 40*f*) connected to the elevator wire ropes (700), respectively, and installed in the body (200*f*); a main rotary shaft (50*f*) rotatably coupled to the body (200*f*) by passing through the tension adjustment unit; and first and second external gears (45*f* and 48*f*), which are fixed to the main rotary shaft (50*f*) such that the first and second external gears (45*f* and 48*f***) are rotatable, and which are coupled to the front and rear surfaces of the tension adjustment unit to transmit rotating forces.

13 Claims, 8 Drawing Sheets

APPARATUS FOR EQUALIZING THE TENSIONS AMONG ELEVATOR WIRE ROPES

TECHNICAL FIELD

The present invention relates to an apparatus for equalizing tensions among elevator wire ropes. More particularly, the present invention relates to an apparatus for equalizing tensions among elevator wire ropes, which can immediately compensate for length variation of the elevator wire ropes when the lengths of the elevator wire ropes are changed due to deformation of the elevator wire ropes caused by mechanical contraction and expansion of the elevator wire ropes suspended to pulleys.

BACKGROUND ART

In general, when an elevator car is reciprocally moved up and down by elevator wire ropes suspended to the elevator car, tensional imbalance may occur among the elevator wire ropes.

For this reason, the tensional imbalance of the elevator wire ropes is periodically managed and inspected. In spite of the periodic inspection and management for the elevator wire ropes, since the tensional imbalance of the elevator wire ropes may occur in real time depending on the temperature of the place where the elevator car is installed and the operation frequency of the elevator car, the tensional imbalance may continue until the next inspection.

Such a tensional imbalance causes the eccentric abrasion of pulleys, so there is difference in the number π of the pulleys. The difference in the number π of the pulleys may cause difference in the travel distance of each elevator wire rope, so a slip may occur in the elevator wire ropes when driving the pulleys, causing longitudinal and transverse vibrations. These longitudinal and transverse vibrations may be directly applied to the elevator car, so that the elevator car may be subject to the longitudinal and transverse vibrations.

For this reason, the elevator car may be damaged, the life span of the elevator car may be shortened, and the riding comport of the elevator car may be degraded.

DISCLOSURE

Technical Problem

The present invention has been made to solve the above problems occurring in the prior art, and an object of the present invention is to provide an apparatus for equalizing tensions among elevator wire ropes, which can immediately eliminate tensional imbalance among the elevator wire ropes when the tensional imbalance occurs among the elevator wire ropes due to difference in the lengths of the elevator wire ropes caused by mechanical contraction and expansion of the elevator wire ropes suspended to pulleys.

Technical Solution

In order to accomplish the above object, the present invention provides an apparatus for equalizing tension among elevator wire ropes, the apparatus including a body formed therein with a receiving space; a tension adjustment unit coupled to a plurality of belts connected to the elevator wire ropes, respectively, and installed in the body; a main rotary shaft rotatably coupled to the body by passing through the tension adjustment unit; first and second external gears, which are fixed to the main rotary shaft such that the first and second external gears are rotatable, and which are coupled to the front and rear surfaces of the tension adjustment unit to transmit rotating forces; and guide rollers rotatably installed in the body such that the belts connected to the tension adjustment unit are connected to outer surfaces of the guide rollers, respectively.

The tension adjustment unit includes a first pulley around which the first belt is wound; a first rotating plate installed in the first pulley and coupled with a plurality of first bevel planet gears; a second pulley around which the second belt is wound in an opposition direction to the first belt; a second rotating plate installed in the first pulley and coupled with a plurality of second bevel planet gears; and a first engagement gear installed between the first and second rotating plates and engaged with the first and second bevel planet gears.

The apparatus further includes a second rotating plate and a third pulley between the second rotating plate and the second external gear, wherein a winding direction of the third belt is opposite to the winding direction of the second belt, a third rotating plate is installed inside the third pulley, and a plurality of third bevel planet gears are engaged with the third rotating plate.

The apparatus further includes a third engagement gear and a fourth pulley between the third pulley and the second external gear, wherein the fourth belt is wound around the fourth pulley, a winding direction of the fourth belt is opposite to the winding direction of the third belt, a fourth rotating plate is installed inside the fourth pulley, and a plurality of fourth bevel planet gears are engaged with the fourth rotating plate.

According to another aspect of the present invention, there is provided an apparatus for equalizing tension among elevator wire ropes, the apparatus including a body formed therein with a receiving space; a tension adjustment unit coupled to a plurality of belts connected to the elevator wire ropes, respectively, and installed in the body; a main rotary shaft rotatably coupled to the body by passing through the tension adjustment unit; and guide rollers rotatably coupled in the body such that the belts connected to the tension adjustment unit are connected to outer surfaces of the guide rollers, respectively.

The tension adjustment unit includes a first pulley around which a first belt is wound; a first ring gear having one side coupled with the first pulley, provided at an inner circumferential portion thereof with first and second internal gears, and rotatably coupled with a sleeve fitted around an outer surface of the main rotary shaft; a first sun gear fixedly coupled to the main rotary shaft, arranged inside the first ring gear and provided at an outer surface thereof with gear teeth; a plurality of first planet gears arranged between the first sun gear and the first internal gear and engaged with the first sun gear and the first internal gear in such a manner that the first planet gears rotatably move along the first internal gear; a second pulley coupled to the other side of the first ring gear and around which a second belt is wound; second and third sun gears coupled with the sleeve of the first ring gear, provided at outer surfaces thereof with gear teeth and integrally coupled with each other; a plurality of second planet gears arranged between the second sun gear and the second internal gear and engaged with the second sun gear 46 and the second internal gear in such a manner that the second planet gears rotatably move along the second internal gear; a plurality of third planet gears engaged with the third sun gear; a second ring gear provided at one side of an inner circumferential portion thereof with a third internal gear engaged with the third planet gears and at the other side of the inner circumferential portion thereof with a fourth internal gear and formed at a center thereof with a sleeve fitted around the outer surface of the main rotary shaft; a third pulley coupled with an outer side of the second ring gear and around which a third belt is wound; a fourth sun gear coupled to the sleeve of the second ring gear and fixedly coupled to the main rotary shaft; a plurality of fourth planet gears arranged between the fourth sun gear and the fourth internal gear and engaged with the fourth sun gear and the fourth internal gear in such a manner that the fourth planet gears rotatably move along the fourth internal gear; and a fourth pulley coupled to the other outer side of the second ring gear and around which the fourth belt is wound.

Advantageous Effect

According to the present invention, where there is difference in the lengths of the elevator wire ropes, the tensional imbalance among the elevator wire ropes is immediately eliminated to equalize tension among the elevator wire ropes, so that the safety, the durability and the reliability of the elevator car can be improved.

BEST MODE

Mode for Invention

Hereinafter, exemplary embodiments of the present invention will be described in detail with reference to accompanying drawings.

First Embodiment

Figure 1:
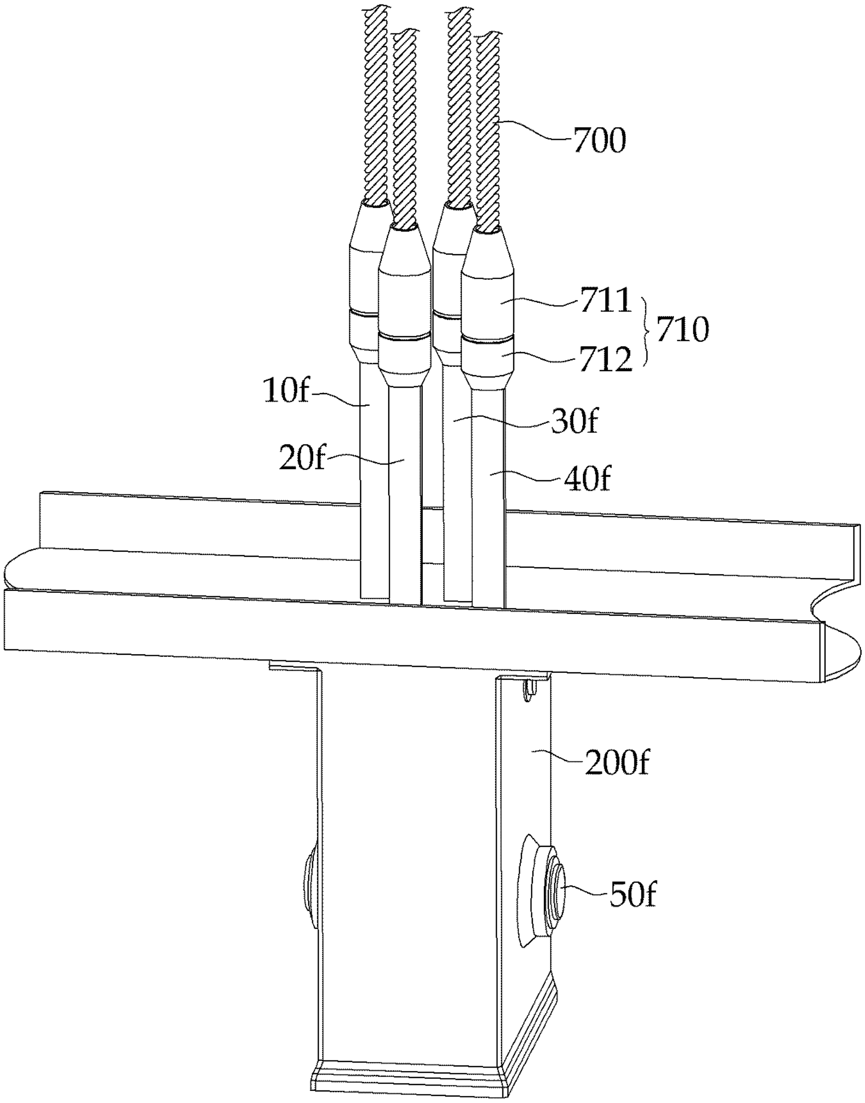
FIG. 1 is a perspective view showing an installation example of an apparatus for equalizing tension among elevator wire ropes according to the present invention.
Figure 2:
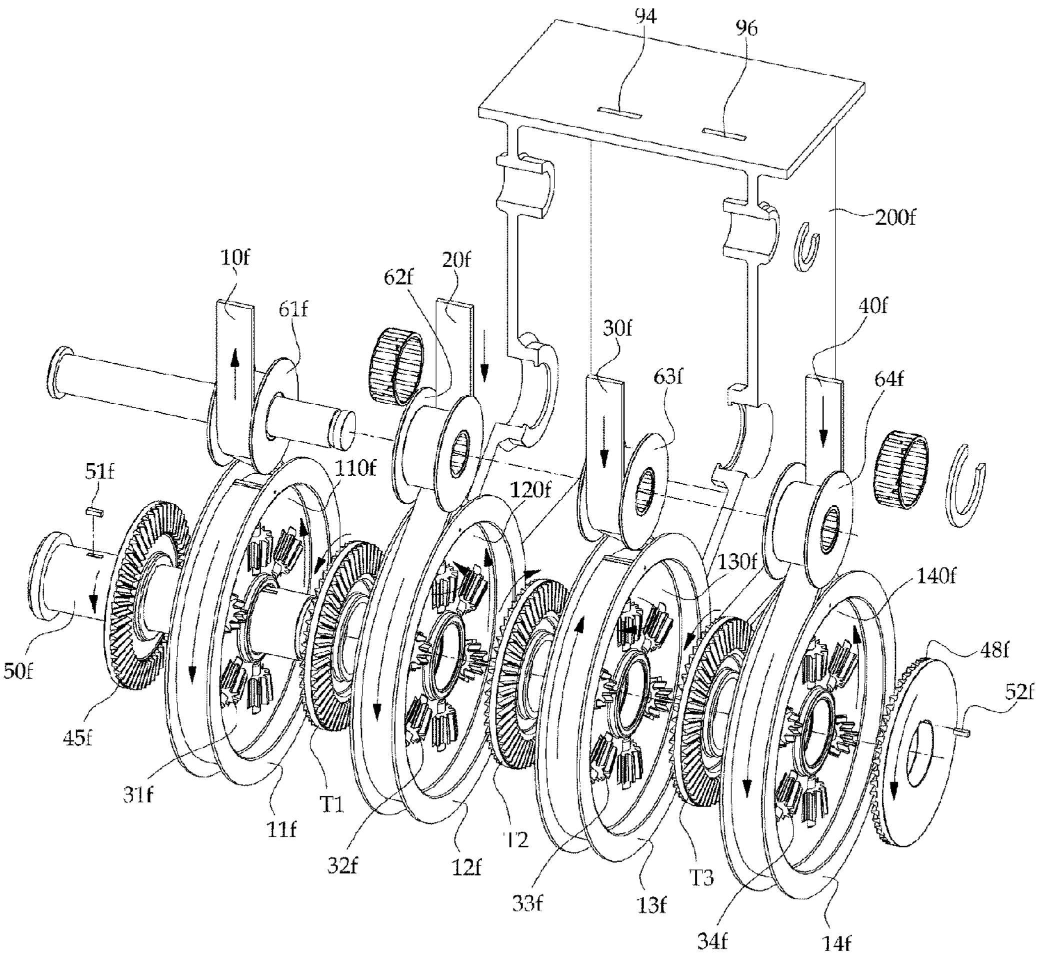
FIG. 2 is an exploded perspective view showing an apparatus for equalizing tension among elevator wire ropes according to the first embodiment of the present invention.
Figure 3:
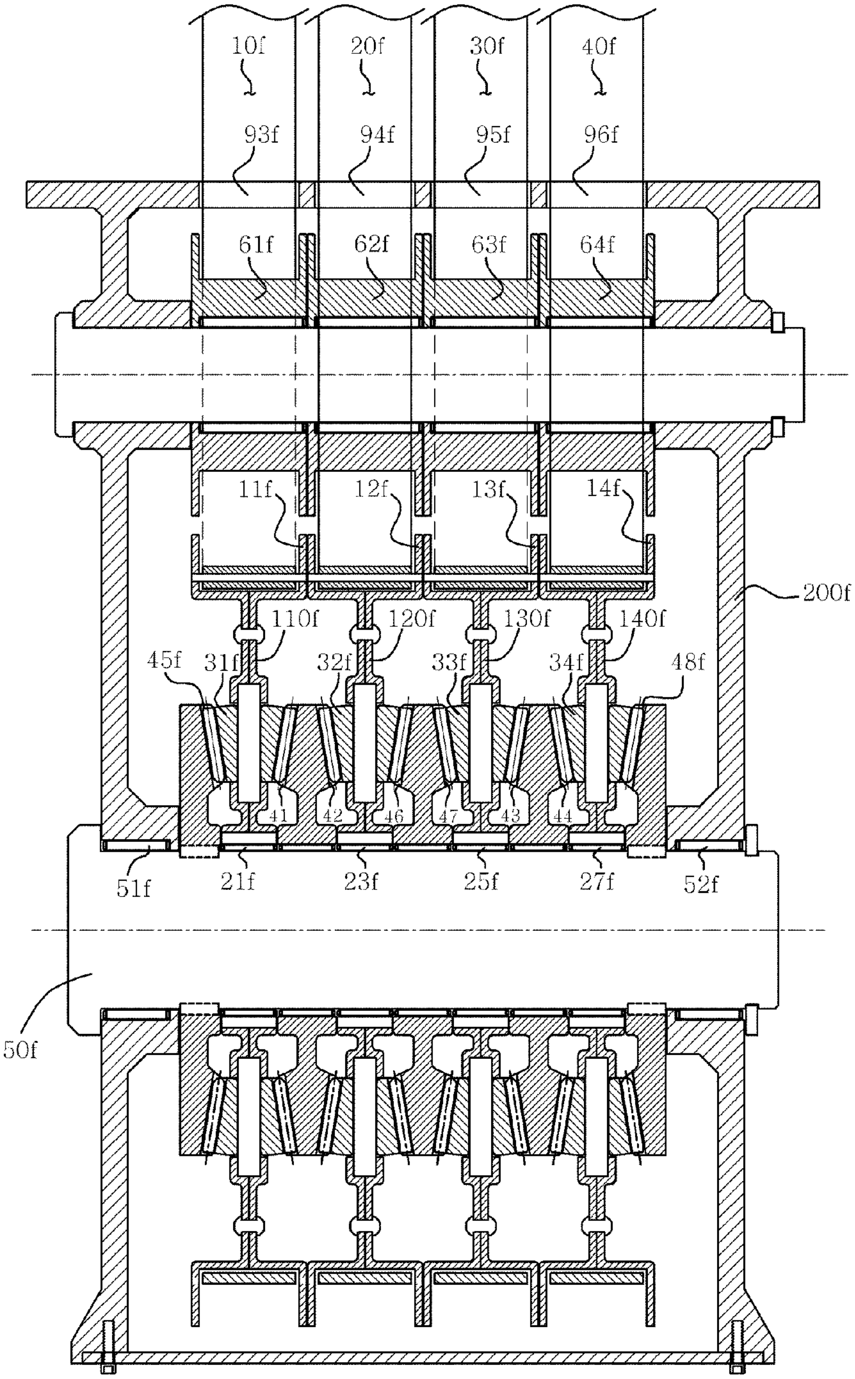
FIG. 3 is a front sectional view showing an apparatus for equalizing tension among elevator wire ropes according to the first embodiment of the present invention.
Figure 4:
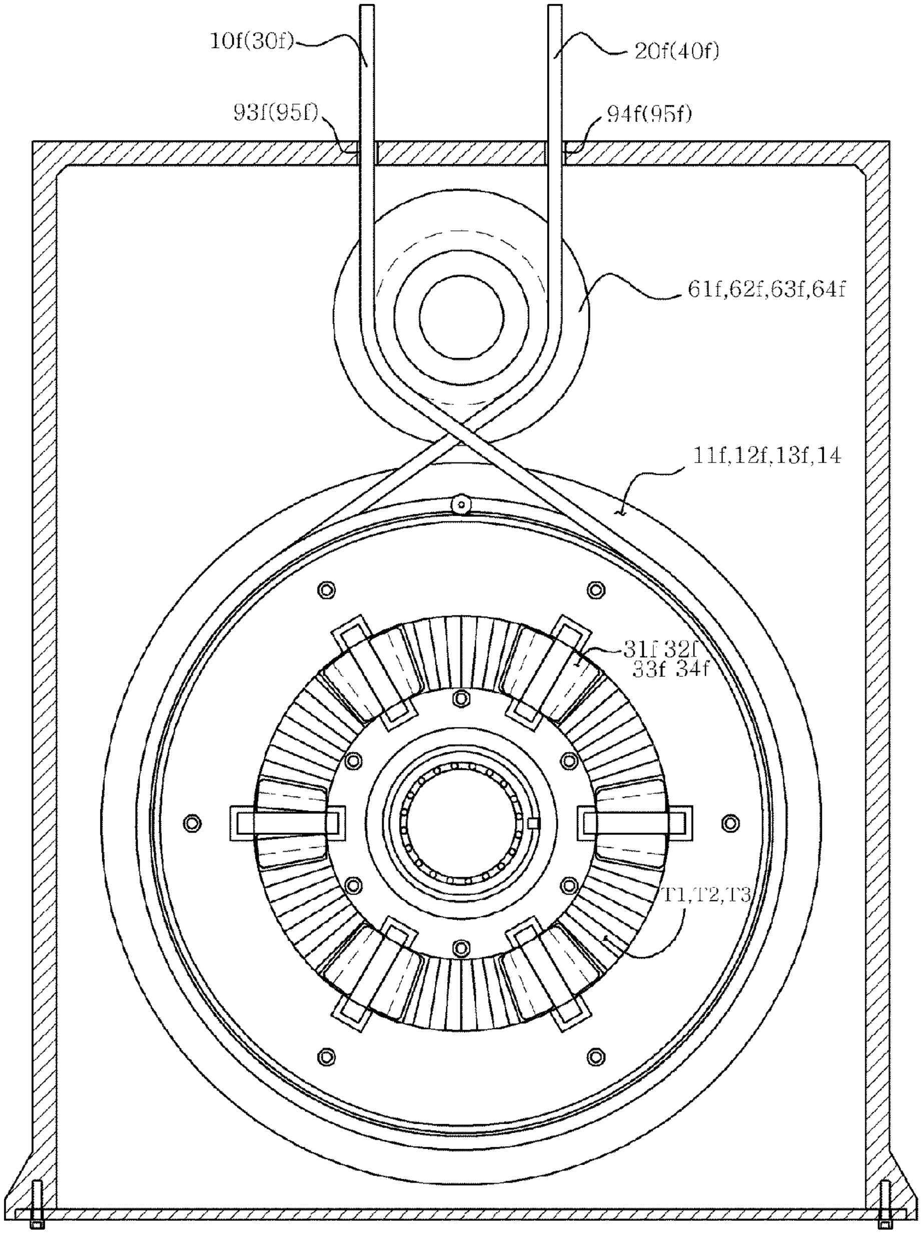
FIG. 4 is a side sectional view showing an apparatus for equalizing tension among elevator wire ropes according to the first embodiment of the present invention.

FIG. 1 is a perspective view showing an installation example of an apparatus for equalizing tension among elevator wire ropes according to the present invention, FIG. 2 is an exploded perspective view showing the apparatus for equalizing tension among elevator wire ropes according to the first embodiment of the present invention, FIG. 3 is a front sectional view showing the apparatus for equalizing tension among elevator wire ropes according to the first embodiment of the present invention, and FIG. 4 is a side sectional view showing the apparatus for equalizing tension among elevator wire ropes according to the first embodiment of the present invention.

As shown in FIGS. 1 to 4, the apparatus for equalizing tension among elevator wire ropes according to the first embodiment of the present invention includes a body **200*f* formed therein with a receiving space; a tension adjustment unit coupled to a plurality of belts 10*f*, 20*f*, 30*f* and 40*f* connected to the elevator wire ropes 700, respectively, and installed in the body 200*f*; a main rotary shaft 50*f* rotatably coupled to the body 200*f* by passing through the tension adjustment unit; first and second external gears 45*f* and 48*f*, which are fixed to the main rotary shaft 50*f* such that the first and second external gears 45*f* and 48*f* are rotatable, and which are coupled to the front and rear surfaces of the tension adjustment unit to transmit rotating forces; and guide rollers 61*f*, 62*f*, 63*f* and 64*f* rotatably installed in the body 200*f* such that the belts 10*f*, 20*f*, 30*f* and 40*f* connected to the tension adjustment unit can be connected to outer surfaces of the guide rollers 61*f*, 62*f*, 63*f* and 64*f***, respectively.

The body **200*f* has a rectangular box shape and the receiving space is formed in the body 200*f* to receive the tension adjustment unit therein. A plurality of slits 93*f*, 94*f*, 95*f* and 96*f* are formed on the top surface of the body 200*f* such that the belts may pass through the slits 93*f*, 94*f*, 95*f* and 96*f***.

After the belts have passed through the slits **93*f*, 94*f*, 95*f* and 96*f*, upper ends of the belts are connected to the wire ropes 700 by fastening members 710**.

Each fastening member 710 includes a first fastening member 711 connected to the wire rope 700 and a second fastening member 712 coupled with the first fastening member 711 and connected to the belt.

The tension adjustment unit is coupled with the belts **10*f*, 20*f*, 30*f* and 40*f* connected to the elevator wire ropes 700 and installed in the body 200*f***.

For the purpose of convenience, the belts are classified into the first to fourth belts **10*f*, 20*f*, 30*f* and 40*f***.

The first to fourth belts **10*f*, 20*f*, 30*f* and 40*f* are wound around first to fourth pulleys 11*f*, 12*f*, 13*f* and 14*f* such that the tension can be adjusted by fastening or releasing the first to fourth belts 10*f*, 20*f*, 30*f* and 40*f***.

Since the first to fourth belts **10*f*, 20*f*, 30*f* and 40*f* are supported on the outer peripheral surfaces of the guide rollers 61*f*, 62*f*, 63*f* and 64*f*, the first to fourth belts 10*f*, 20*f*, 30*f* and 40*f* are taut, so that the tension can be uniformly maintained among the first to fourth belts 10*f*, 20*f*, 30*f* and 40*f***.

Although the present invention discloses four belts and four pulleys **11*f*, 12*f*, 13*f* and 14*f*** cooperated with the four belts, the present invention is not limited thereto.

For instance, more than four belts and pulleys may be employed in the present invention.

In order to accomplish the object of the present invention, at least two belts and at least two pulleys cooperated with the belts must be provided.

The tension adjustment unit includes the first pulley **11*f* around which the first belt 10*f* is wound; a first rotating plate 110*f* installed in the first pulley 11*f* and coupled with a plurality of first bevel planet gears 31*f*; the second pulley 12*f* around which the second belt 20*f* is wound in the opposition direction to the first belt 20*f*; a second rotating plate 120*f* installed in the first pulley 11*f* and coupled with a plurality of second bevel planet gears 32*f*; and a first engagement gear T1 installed between the first and second rotating plates 110*f* and 120*f* and engaged with the first and second bevel planet gears 31*f* and 32*f***.

The winding direction of the first belt **10*f* is opposite to the winding direction of the second belt 20*f*. In detail, referring to FIG. 2, the first belt 10***f* is wound around the first pulley 11*f* in the direction from the front to the rear of the first pulley 11*f* and then extends upward while being wound around the guide roller 61*f*. An upper end of the first belt 10*f* is connected to the wire rope 700.

In contrast, the second belt 20*f* is wound around the second pulley 12*f* in the direction from the rear to the front of the second pulley 12*f* and then extends upward while being wound around the guide roller 62*f*. An upper end of the second belt 20*f* is connected to the wire rope 700.

The first and second pulleys 11*f* and 12*f* have ring shapes in which the first and second rotating plates 110*f* and 120*f* are accommodated therein. Rims are provided at outer portions of the first and second pulleys 11*f* and 12*f* to prevent the first and second belts 10*f* and 20*f* from being separated from the first and second pulleys 11*f* and 12*f*.

The first and second rotating plates 110*f* and 120*f* have disc shapes and holes are formed at center portions of the first and second rotating plates 110*f* and 120*f*, respectively, such that the main rotary shaft 50*f* can extend by passing through the holes. Bearings 21*f* and 23*f* are installed in the holes in such a manner that the bearings 21*f* and 23*f* can be fitted around the main rotary shaft 50*f* (see, FIG. 3). The first and second bevel planet gears 31*f* and 32*f* are rotatably coupled to the bearings 21*f* and 23*f*, respectively.

Bearings 25*f* and 27*f* are installed in third and fourth rotating plates 130*f* and 140*f*, respectively, which will be described later.

The first and second bevel planet gears 31*f* and 32*f* have truncated conical shapes having small lower portions and large upper portions and teeth are formed at outer portions of the first and second bevel planet gears 31*f* and 32*f*. The first and second bevel planet gears 31*f* and 32*f* are rotatably coupled with the first and second rotating plates 110*f* and 120*f*, respectively.

The first engagement gear T1 has a disc shape and is provided at both surfaces thereof with gears engaged with the first and second bevel planet gears 31*f* and 32*f*. The second and third engagement gears T2 and T3, which will be described later, have the shapes the same as the shape of the first engagement gear T1.

Meanwhile, the present invention includes third and fourth pulleys 13*f* and 14*f* coupled with the third and fourth belts 30*f* and 40*f*. The third and fourth pulleys 13*f* and 14*f* are engaged with bevel gears.

According to the present invention, only the third belt 30*f* and the third pulley 13*f* can be provided or the fourth belt 40*f* and the fourth pulley 14*f* can be further added.

For instance, the second engagement gear T2 and the third pulley 13*f* are further coupled between the second rotating plate 120*f* of the second pulley 12*f* and the second external gear 48*f*.

The third belt 30*f* is wound around the third pulley 13*f* and the winding direction of the third belt 30*f* is opposite to the winding direction of the second belt 20*f*. The third rotating plate 130*f* is installed inside the third pulley 13*f* and a plurality of third bevel planet gears 33*f* are coupled to the third rotating plate 130*f*.

Thus, the third bevel planet gears 33*f* are engaged with the second engagement gear T2, so that the third bevel planet gears 33*f* and the third pulley 13*f* are rotated together by the rotating force of the second engagement gear T2.

In addition, the third engagement gear T3 is further coupled between the third pulley 13*f* and the second external gear 48*f*. The third engagement gear T3 is engaged with the third bevel planet gears 33*f* of the third pulley 13*f*.

Further, the fourth pulley 14*f* is coupled with the third engagement gear T3. The fourth belt 40*f* is wound around the fourth pulley 14*f* and the winding direction of the fourth belt 40*f* is opposite to the winding direction of the third belt 20*f*. The fourth rotating plate 140*f* is installed inside the fourth pulley 14*f* and a plurality of fourth bevel planet gears 34*f* are coupled to the forth rotating plate 140*f*.

Meanwhile, when the rotating force of the first pulley 11*f* is transferred to the first and second engagement gears T1 and T2 and the second to fourth bevel planet gears 32*f* to 34*f* engaged with the first and second engagement gears T1 and T2, the rotating force of the final fourth pulley 14*f* may be lowered due to the energy loss.

In order to solve the above problem, the first external gear 45*f* is provided in opposition to the first pulley 11*f* such that the first external gear 45*f* can be coupled with the first bevel planet gears 31*f*. The first external gear 45*f* is integrally coupled with the main rotary shaft 50*f*.

The first external gear 45*f* can be integrated with the main rotary shaft 50*f* by means of a key 51*f*, which will be described later.

Thus, as the first pulley 11*f* rotates, the rotating force of the first pulley 11*f* can be transferred to both of the first engagement gear T1 and the first external gear 45*f*.

In addition, the second external gear 48*f* is installed at the other end of the main rotary shaft 50*f* such that the second external gear 48*f* can be coupled with the fourth bevel planet gears 34*f*.

Therefore, the rotating force of the first external gear 45*f* is transferred to the second external gear 48*f* through the main rotary shaft 50*f*, so the second external gear 48*f* can rotate the fourth bevel planet gears 34*f* and the fourth pulley 14*f*. Thus, the rotating force can be uniformly distributed.

The key is a coupling unit mainly used for coupling a shaft with a gear.

In detail, a key slot having a predetermined length and a predetermined depth is formed in the outer surface of the main rotary shaft 50*f* and slots are formed at shaft coupling holes of the first and second external gears 45*f* and 48*f* in correspondence with the key slot.

Then, after matching the key slot of the main rotary shaft 50*f* with the shaft coupling holes of the first and second external gears 45*f* and 48*f*, bar-shape keys 51*f* and 52*f* are inserted between the key slot and the shaft coupling holes, so that the main rotary shaft 50*f* can be integrally coupled with the first and second external gears 45*f* and 48*f*.

Hereinafter, the operation of the first embodiment according to the present invention will be described.

The rotating direction of each component is shown in FIG. 2, and the following description will be made based on FIG. 2.

According to the feature of the present invention, when the length of the first belt 10*f* wound around the first pulley 11*f* is increased, the lengths of the belts wound around the second to fourth pulleys 12*f* to 14*f* are reduced corresponding to the increment in the length of the first belt 10*f*, thereby constantly maintaining the tension among the elevator wire ropes.

If the first belt 10*f* is pulled upward, the first pulley 11*f* rotates counterclockwise, so the first rotating plate 110*f* rotates counterclockwise and the first bevel planet gears 31*f* rotatably moves counterclockwise together with the first rotating plate 110*f*. Thus, the first engagement gear T1 engaged with the first bevel planet gears 31*f* rotates counterclockwise.

Subsequently, the second bevel planet gears 32*f* engaged with the first engagement gear T1 rotatably moves counterclockwise, so that the second rotating plate 120*f* rotates counterclockwise. Thus, the second pulley 12*f* coupled with the second rotating plate 120*f* rotates counterclockwise.

As the second pulley 12*f* rotates counterclockwise, the second belt 20*f* is wound around the second pulley 12*f* while being pulled downward.

The second bevel planet gears 32*f* may rotate while rotatably move along first engagement gear T1. That is, the second bevel planet gears 32*f* may rotate counterclockwise about the longitudinal axes thereof.

Meanwhile, as the second bevel planet gears 32*f* rotate counterclockwise, the second engagement gear T2 engaged with the second bevel planet gears 32*f* rotates clockwise.

Since the second engagement gear T2 rotates clockwise, the third bevel planet gears 33*f* engaged with the second engagement gear T2 rotatably move clockwise, so that the third rotating plate 130*f* and the third pulley 13*f* may rotate clockwise. Thus, the third belt 30*f* is wound around the third pulley 13*f*.

The third bevel planet gears 33*f* are designed to rotate clockwise.

Thus, the third engagement gear T3 engaged with the third bevel planet gears 33*f* rotates counterclockwise.

Accordingly, the fourth bevel planet gears 34*f* engaged with the third engagement gear T3 may rotate counterclockwise, so that the fourth rotating plate 140*f* and the fourth pulley 14*f* may rotate counterclockwise. Thus, the fourth belt 40*f* is wound around the fourth pulley 14*f*.

Meanwhile, as the first pulley 11*f* rotates counterclockwise, the first external gear 45*f* may rotate counterclockwise, so that the main rotary shaft 50*f* and the second external gear 48*f* also rotate counterclockwise.

Therefore, the rotating force of the second external gear 48*f* can be transferred to the fourth bevel planet gears 34*f* and the fourth rotating plate 140*f*, so that the winding force of the fourth pulley 14*f* to the fourth belt 40*f* can be increased. In this manner, the rotating force of the second external gear 48*f* can be reversely transferred to the third engagement gear T3.

Thus, the rotating force of the first pulley 11*f* transferred to the fourth pulley 140*f* can be reinforced.

That is, due to the rotation of the first and second external gears 45*f* and 48*f* and the main rotary shaft 50*f*, the rotating force of the first pulley 11*f* can be additionally transferred to the fourth pulley 14*f*, so that the loss of the rotating force transferred to the fourth pulley 14*f* can be compensated.

Second Embodiment

Figure 5:
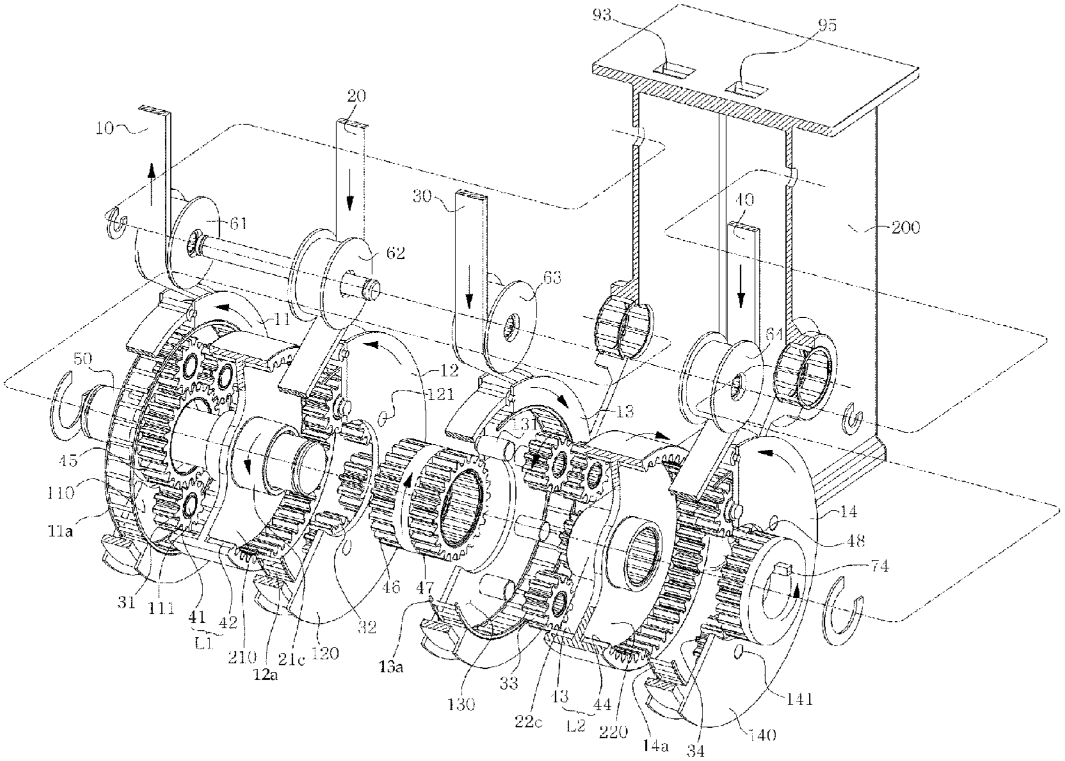
FIG. 5 is an exploded perspective view showing an apparatus for equalizing tension among elevator wire ropes according to the second embodiment of the present invention.
Figure 6:
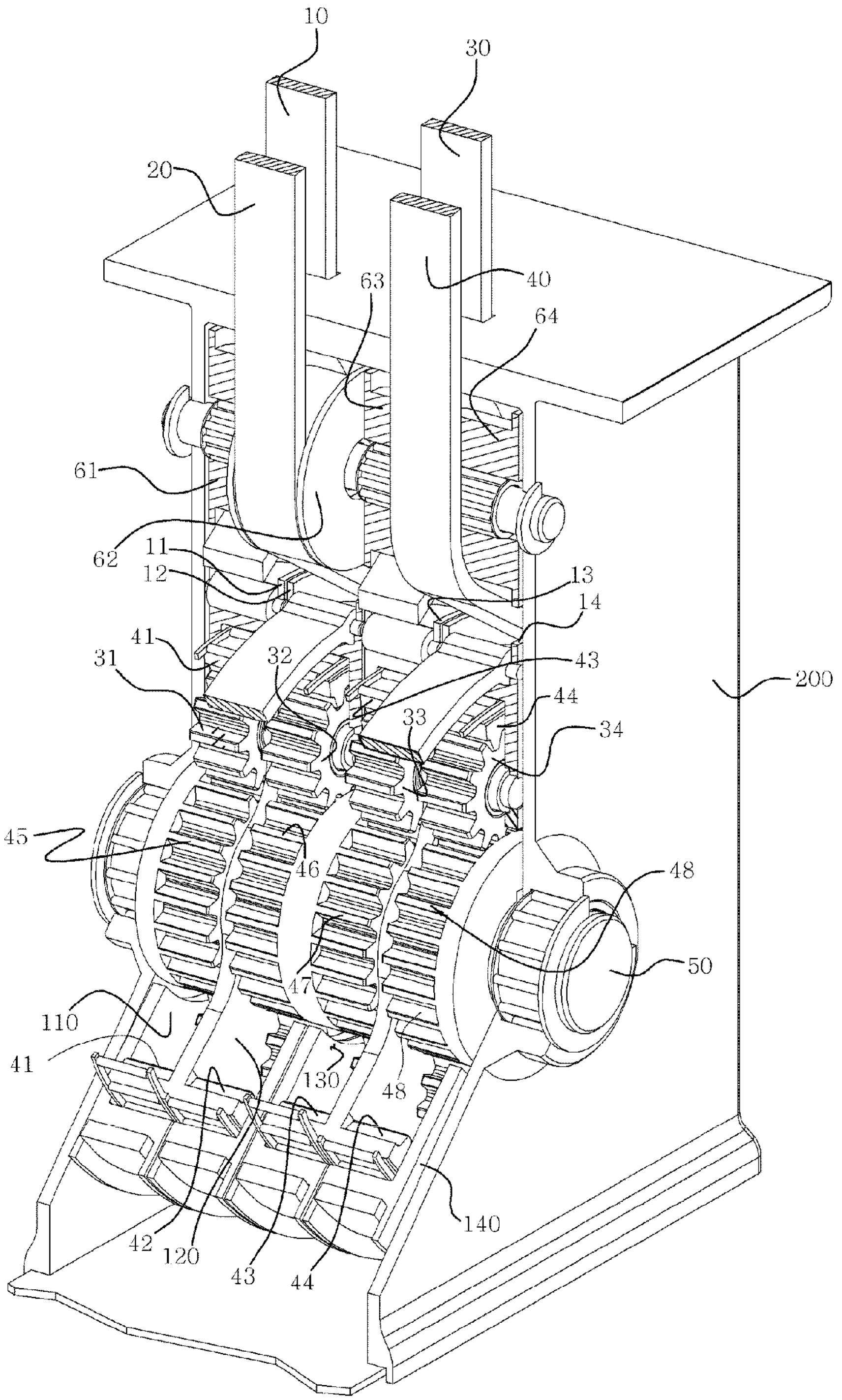
FIG. 6 is an assembled perspective view showing an apparatus for equalizing tension among elevator wire ropes according to the second embodiment of the present invention.
Figure 7:
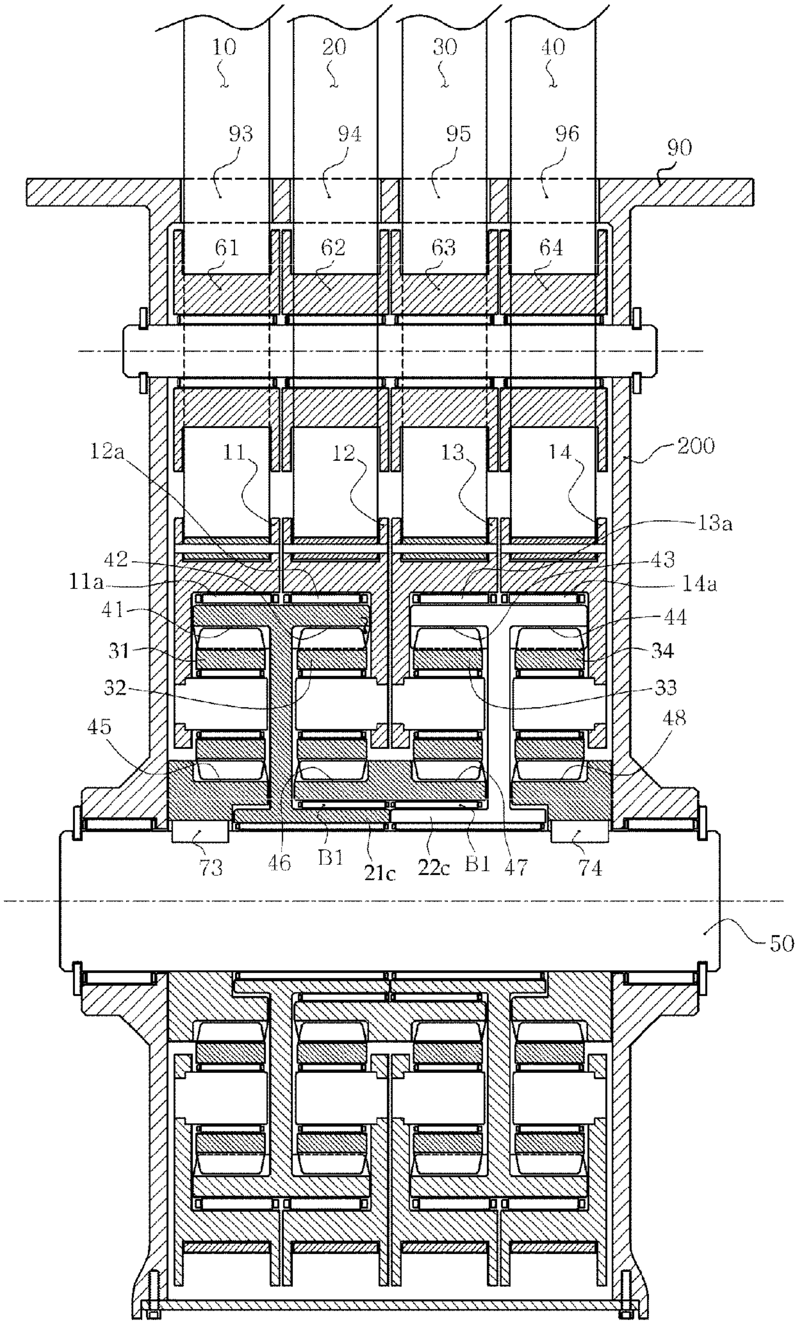
FIG. 7 is a front sectional view showing an apparatus for equalizing tension among elevator wire ropes according to the second embodiment of the present invention.
Figure 8:
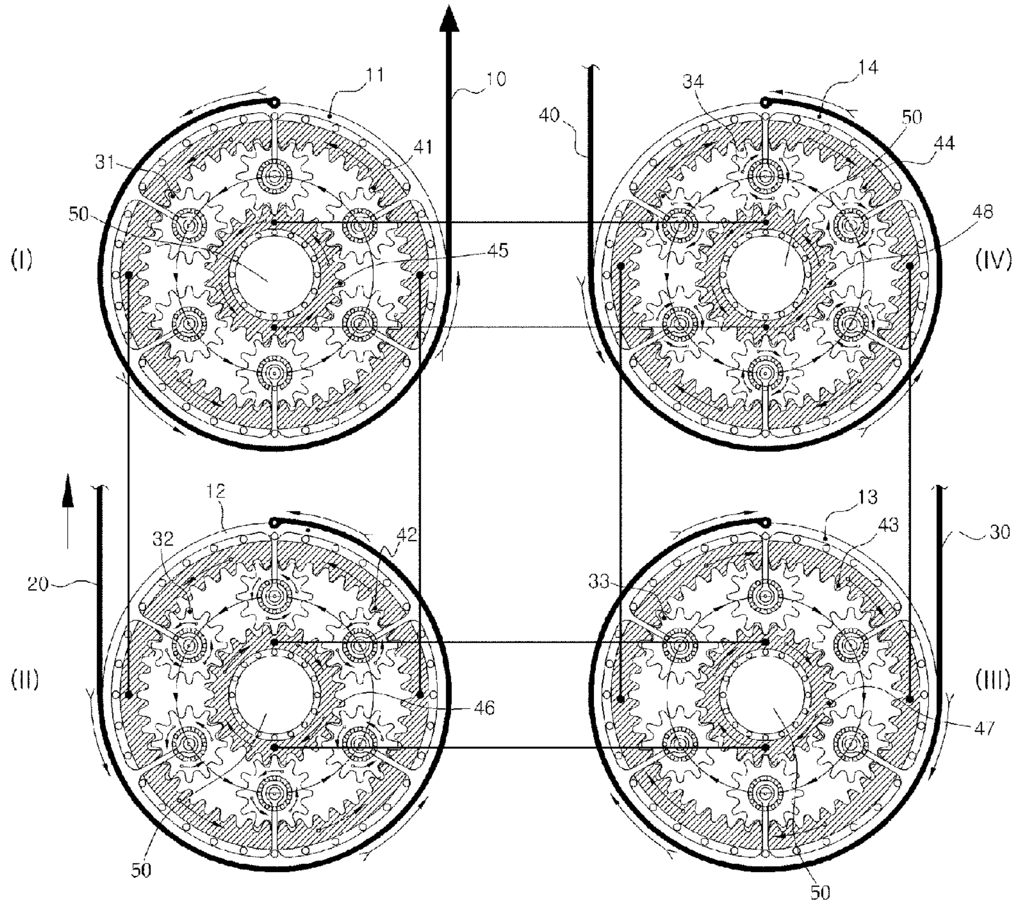
FIG. 8 is a view showing the operation of an apparatus for equalizing tension among elevator wire ropes according to the second embodiment of the present invention.

FIG. 5 is an exploded perspective view showing an apparatus for equalizing tension among elevator wire ropes according to the second embodiment of the present invention; FIG. 6 is an assembled perspective view showing the apparatus for equalizing tension among elevator wire ropes according to the second embodiment of the present invention, FIG. 7 is a front sectional view showing the apparatus for equalizing tension among elevator wire ropes according to the second embodiment of the present invention, and FIG. 8 is a view showing the operation of the apparatus for equalizing tension among elevator wire ropes according to the second embodiment of the present invention.

As shown in FIGS. 5 to 8, the apparatus for equalizing tension among elevator wire ropes according to the second embodiment of the present invention includes a body 200 formed therein with a receiving space; a tension adjustment unit coupled to a plurality of belts connected to the elevator wire ropes 700, respectively, and installed in the body 200; a main rotary shaft 50 rotatably coupled to the body 200 by passing through the tension adjustment unit; and guide rollers 61, 62, 63 and 64 rotatably installed in the body 200 such that the belts connected to the tension adjustment unit can be connected to outer surfaces of the guide rollers 61, 62, 63 and 64, respectively.

The tension adjustment unit includes a first pulley 11 around which a first belt 10 is wound; a first ring gear L1 having one side coupled with the first pulley 11, provided at an inner circumferential portion thereof with first and second internal gears 41 and 42, and rotatably coupled with a sleeve 21*c* fitted around an outer surface of the main rotary shaft 50; a first sun gear 45 fixedly coupled to the main rotary shaft 50, arranged inside the first ring gear L1 and provided at an outer surface thereof with gear teeth; a plurality of first planet gears 31 arranged between the first sun gear 45 and the first internal gear 41 and engaged with the first sun gear 45 and the first internal gear 41 in such a manner that the first planet gears 31 rotatably move along the first internal gear 41; a second pulley 12 coupled to the other side of the first ring gear L1 and around which a second belt 20 is wound; second and third sun gears 46 and 47 coupled with the sleeve 21*c* of the first ring gear L1, provided at outer surfaces thereof with gear teeth and integrally coupled with each other; a plurality of second planet gears 32 arranged between the second sun gear 46 and the second internal gear 42 and engaged with the second sun gear 46 and the second internal gear 42 in such a manner that the second planet gears 32 rotatably move along the second internal gear 42; a plurality of third planet gears 33 engaged with the third sun gear 47; a second ring gear L2 provided at one side of an inner circumferential portion thereof with a third internal gear 43 engaged with the third planet gears 33 and at the other side of the inner circumferential portion thereof with a fourth internal gear 44 and formed at a center thereof with a sleeve 22*c* fitted around the outer surface of the main rotary shaft 50; a third pulley 13 coupled with an outer side of the second ring gear L2 and around which a third belt 30 is wound; a fourth sun gear 48 coupled to the sleeve 22*c* of the second ring gear L2 and fixedly coupled to the main rotary shaft 50; a plurality of fourth planet gears 34 arranged between the fourth sun gear 48 and the fourth internal gear 44 and engaged with the fourth sun gear 48 and the fourth internal gear 44 in such a manner that the fourth planet gears 34 rotatably move along the fourth internal gear 44; and a fourth pulley 14 coupled to the other outer side of the second ring gear L2 and around which the fourth belt 40 is wound.

The first and fourth sun gears 45 and 48 have the cylindrical structure and are provided at outer surfaces thereof with gear teeth.

The first and fourth sun gears 45 and 48 are integrally formed with the main rotary shaft 50.

As described above, the first and fourth sun gears 45 and 48 can be integrally formed with the main rotary shaft 50 by means of keys 73 and 74.

The second and third sun gears 46 and 47 can be prepared in the form of a single cylindrical structure and a bearing B1 coupled with the main rotary shaft 50 can be provided at the center of the second and third sun gears 46 and 47.

The winding direction of the first belt 10 is opposite to the winding direction of the second belt 20, the winding direction of the third belt 30 is opposite to the winding direction of the second belt 20, and the winding direction of the fourth belt 40 is opposite to the winding direction of the third belt 30.

The first ring gear L1 includes a cylindrical rim member and a disc plate 210 attached to an inner portion of the cylindrical rim member. The cylindrical sleeve 21*c* is provided at the center of the disc plate 210 such that the cylindrical sleeve 21*c* can be coupled with the main rotary shaft 50, and the first and second pulleys 11 and 12 are coupled to one side of the outer surface of the rim member. In addition, the first and second internal gears 41 and 42 are provided at upper and lower portions of an inner surface of the rim member about the disc plate 210.

Retainer rings 11*a* and 12*a* are provided between the outer surface of the first ring gear L1 and the first and second pulleys 11 and 12 to serve as bearings.

The second ring gear L2 includes a cylindrical rim member coupled to the third and fourth pulleys 13 and 14 and a disc plate 220 attached to an inner portion of the cylindrical rim member. The cylindrical sleeve 22*c* is provided at the center of the disc plate 220 such that the cylindrical sleeve 22*c* can be coupled with the main rotary shaft 50, and the third and fourth internal gears 43 and 44 are provided at upper and lower portions of an inner surface of the rim member about the disc plate 220.

Retainer rings 13*a* and 14*a* are provided between the outer surface of the second ring gear L1 and the third and fourth pulleys 13 and 14 to serve as bearings.

The bearings B1 fitted around the main rotary shaft 50 are installed in the sleeves 21*c* and 22*c* of the first and second ring gears L1 and L2 to reduce the frictional resistance upon rotation (see, FIG. 7).

The first to fourth pulleys 11 to 14 have the ring shape provided therein with rotating plates 110 to 140. Rims are provided at outer peripheral portions of the first t fourth pulleys 11 to 14 to prevent the belts from being separated from the first to fourth pulleys 11 to 14. The first to fourth planet gears 31 to 34 are rotatably coupled with the rotating plates 110 to 140 by shaft pins 111, 121, 131 and 141, respectively.

Hereinafter, the operation of the second embodiment of the present invention will be described with reference to FIGS. 5 to 8.

When the first pulley 11 rotates counterclockwise, the gears installed in the pulleys are under the balance state of force, so the first planet gears 31 and the first sun gear 45 rotate counterclockwise (see, FIG. 8 (I)).

At this time, the second internal gear 42 integrally formed with the first internal gear 41 rotates counterclockwise, so that the second planet gears 32 rotatably move counterclockwise.

Since the second sun gear 46 tends to maintain the balance of force, the second sun gear 46 engaged with the second internal gear 42 rotates counterclockwise while applying the force to the second sun gear so that the second gear 46 rotates clockwise (see, FIG. 8 (II)). In addition, the second planet gears 32 rotatably move counterclockwise, so the second pulley 12 coupled with the second planet gears 32 rotates counterclockwise so that the belt 20 is wound around the second pulley 12.

In addition, the third sun gear 47 integrally formed with the second sun gear 46 rotate clockwise (see, FIG. 8 (III)).

Meanwhile, the fourth sun gear 48, which is integrally formed with the first sun gear 45 rotating counterclockwise, may rotate counterclockwise so that the fourth planet gears 34 are rotatably moved counterclockwise (see, FIG. 8 (IV)).

Since the fourth internal gear 44 tends to maintain the balance of force, the fourth planet gears 34 rotating clockwise applies force to the fourth internal gear 44 so that the fourth internal gear 44 rotates clockwise.

In addition, the fourth planet gears 34 rotatably move counterclockwise, so the fourth pulley 14 rotates counterclockwise, so that the fourth belt 40 is wound around the fourth pulley 14.

Referring again to FIGS. 8 (II) and (III), the second sun gear 46 and the third sun gear 47 rotate in the same direction, that is, the clockwise direction when taking into consideration the force and the direction of the force applied to the third sun gear 47 and the third internal gear 43.

In addition, referring to FIGS. 8 (III) and (IV), since the third and fourth internal gears 43 and 44 are integrally formed with each other, they rotate counterclockwise.

Therefore, since the third sun gear 47 and the third internal gear rotate counterclockwise, the third planet gears 33 rotate clockwise and rotatably move counterclockwise.

Thus, the third pulley 13 rotates clockwise, so that the third belt 30 is wound around the third pulley 13.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An apparatus for equalizing tension among elevator wire ropes, the apparatus comprising:

a body formed therein with a receiving space;

a tension adjustment unit coupled to a plurality of belts connected to the elevator wire ropes, respectively, and installed in the body;

a main rotary shaft rotatably coupled to the body by passing through the tension adjustment unit; and first and second external gears, which are fixed to the main rotary shaft such that the first and second external gears are rotatable, and which are coupled to the front and rear surfaces of the tension adjustment unit to transmit rotating forces;

wherein the tension adjustment unit comprises:

a first pulley around which a first belt of the plurality of belts is wound;

a first rotating plate installed in the first pulley and coupled with a plurality of first bevel planet gears;

a second pulley around which a second belt of the plurality of belts is wound in an opposition direction to the first belt;

a second rotating plate installed in the second pulley and coupled with a plurality of second bevel planet gears;

a first engagement gear installed between the first and second rotating plates and engaged with the first and second bevel planet gears; and a third rotating plate and a third pulley located between the second rotating plate and the second external gear, wherein a winding direction of a third belt of the plurality of belts is opposite to the winding direction of the second belt, the third rotating plate is installed inside the third pulley, and a plurality of third bevel planet gears are engaged with the third rotating plate.

2. The apparatus of claim 1, further comprising a third engagement gear and a fourth pulley located between the third pulley and the second external gear, wherein a fourth belt of the plurality of belts is wound around the fourth pulley, a winding direction of the fourth belt is opposite to the winding direction of the third belt, a fourth rotating plate is installed inside the fourth pulley, and a plurality of fourth bevel planet gears are engaged with the fourth rotating plate.

3. The apparatus of claim 2, wherein the second external gear is engaged with the fourth bevel planet gears of the fourth pulley, and the second external gear is fixedly coupled with the main rotary shaft by a key.

4. The apparatus of claim 1, wherein the first external gear is engaged with the first bevel planet gears of the first pulley, the second external gear is engaged with the second bevel planet gears of the second pulley, and the first and second external gears are fixedly coupled with the main rotary shaft by keys.

5. The apparatus of claim 1, wherein the second external gear is engaged with the third bevel planet gears of the third pulley, and the second external gear is fixedly coupled with the main rotary shaft by a key.

6. The apparatus of claim 1, further comprising guide rollers rotatably installed in the body such that the plurality of belts connected to the tension adjustment unit are connected to outer surfaces of the guide rollers, respectively.

7. An apparatus for equalizing tension among elevator wire ropes by automatically correcting imbalance caused by variation in lengths of the elevator wire ropes, the apparatus comprising:

a body formed therein with a receiving space;

a tension adjustment unit coupled to a plurality of belts connected to the elevator wire ropes, respectively, and installed in the body;

a main rotary shaft rotatably coupled to the body by passing through the tension adjustment unit; and guide rollers rotatably coupled in the body such that the plurality of belts connected to the tension adjustment unit can be are connected to outer surfaces of the guide rollers, respectively, wherein the tension adjustment unit comprises:

a first pulley around which a first belt of the plurality of belts is wound;

a first ring gear having one side coupled with the first pulley, provided at an inner circumferential portion thereof with first and second internal gears, and rotatably coupled with a sleeve fitted around an outer surface of the main rotary shaft;

a first sun gear fixedly coupled to the main rotary shaft, arranged inside the first ring gear and provided at an outer surface thereof with gear teeth;

a plurality of first planet gears arranged between the first sun gear and the first internal gear and engaged with the first sun gear and the first internal gear in such a manner that the first planet gears rotatably move along the first internal gear;

a second pulley coupled to the other side of the first ring gear and around which a second belt of the plurality of belts is wound;

second and third sun gears coupled with the sleeve of the first ring gear, provided at outer surfaces thereof with gear teeth and integrally coupled with each other;

a plurality of second planet gears arranged between the second sun gear and the second internal gear and engaged with the second sun gear and the second internal gear in such a manner that the second planet gears rotatably move along the second internal gear;

a plurality of third planet gears engaged with the third sun gear;

a second ring gear provided at one side of an inner circumferential portion thereof with a third internal gear engaged with the third planet gears and at the other side of the inner circumferential portion thereof with a fourth internal gear and formed at a center thereof with a sleeve fitted around the outer surface of the main rotary shaft;

a third pulley coupled with an outer side of the second ring gear and around which a third belt of the plurality of belts is wound;

a fourth sun gear coupled to the sleeve of the second ring gear and fixedly coupled to the main rotary shaft;

a plurality of fourth planet gears arranged between the fourth sun gear and the fourth internal gear and engaged with the fourth sun gear and the fourth internal gear in such a manner that the fourth planet gears rotatably move along the fourth internal gear; and a fourth pulley coupled to the other outer side of the second ring gear and around which a fourth belt of the plurality of belts is wound.

8. The apparatus of claim 7, wherein the first and fourth sun gears have cylindrical structures and are provided at outer surfaces thereof with gear teeth, in which the first and fourth sun gears are integrally formed with the main rotary shaft by keys.

9. The apparatus of claim 7, wherein the second and third sun gears are prepared in a form of a single cylindrical structure and a bearing coupled with the main rotary shaft is be provided at a center of the second and third sun gears.

10. The apparatus of claim 7, wherein a winding direction of the first belt is opposite to a winding direction of the second belt, a winding direction of the third belt is opposite to the winding direction of the second belt, and a winding direction of the fourth belt is opposite to the winding direction of the third belt.

11. The apparatus of claim 7, wherein the first ring gear comprises:

a disc plate provided at a center thereof with a sleeve coupled with the main rotary shaft;

a rim member provided at an outer surface of the disc plate and coupled with the first and second pulleys; and first and second internal gears provided at upper and lower portions of an inner surface of the rim member about the disc plate.

12. The apparatus of claim 7, wherein the second ring gear comprises:

a disc plate provided at a center thereof with a sleeve coupled with the main rotary shaft;

a rim member provided at an outer surface of the disc plate and coupled with the third and fourth pulleys; and third and fourth internal gears provided at upper and lower portions of an inner surface of the rim member about the disc plate.

13. The apparatus of claim 7, further comprising a plurality of shaft pins provided in rotating plates to couple the first to fourth planet gears to the first to fourth pulleys.

* * * * *